June 22, 1948.  C. E. ALEXANDER  2,443,972
LOGGING CART
Filed Nov. 12, 1946  4 Sheets-Sheet 3
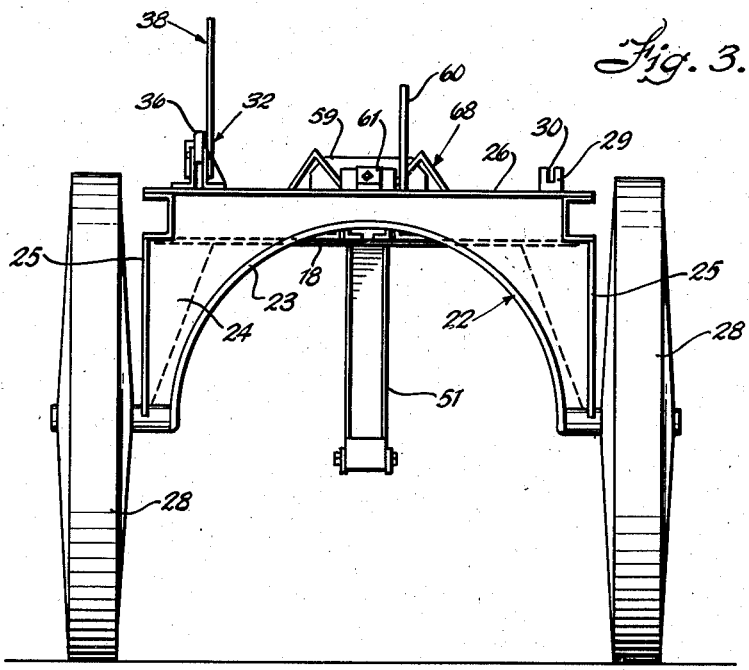
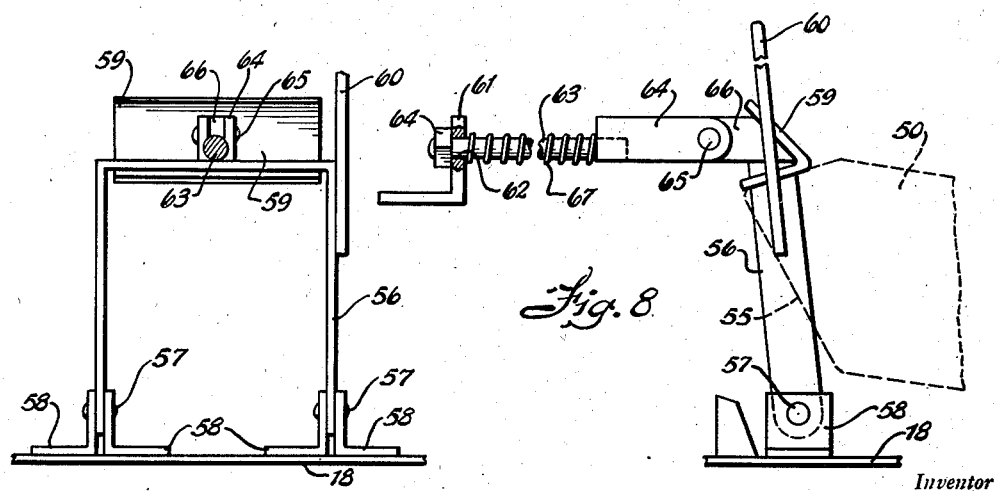
Inventor
Charles E. Alexander.

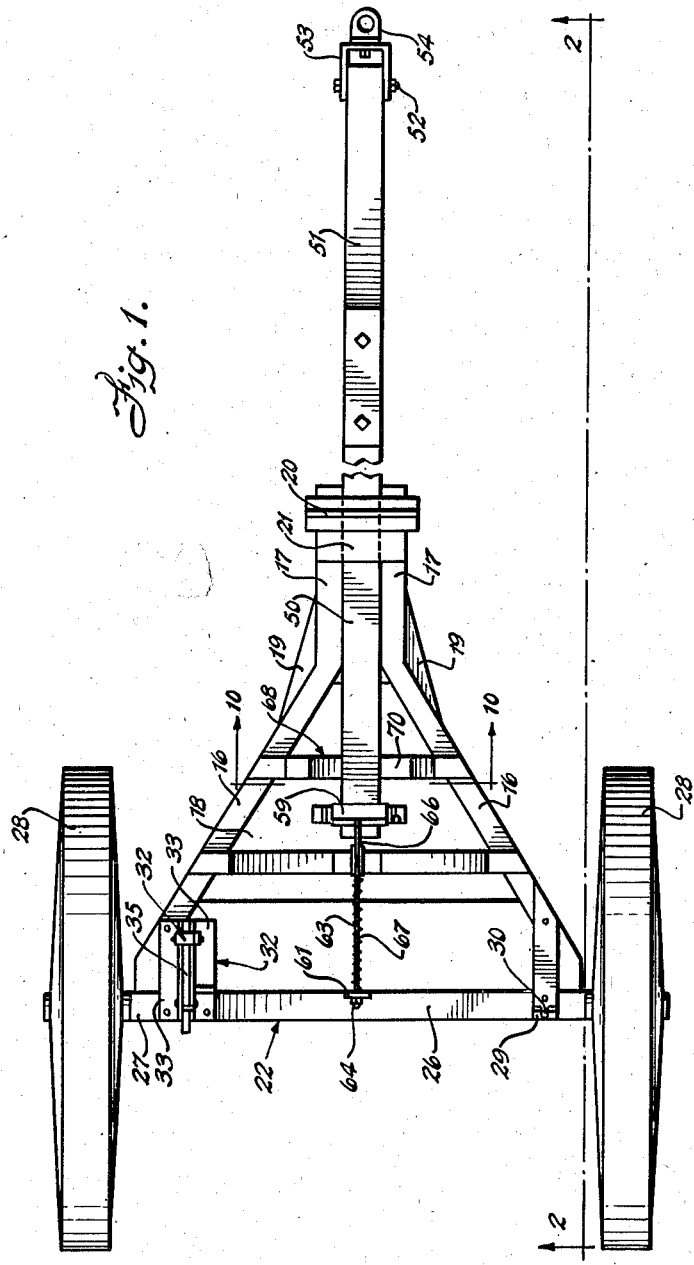

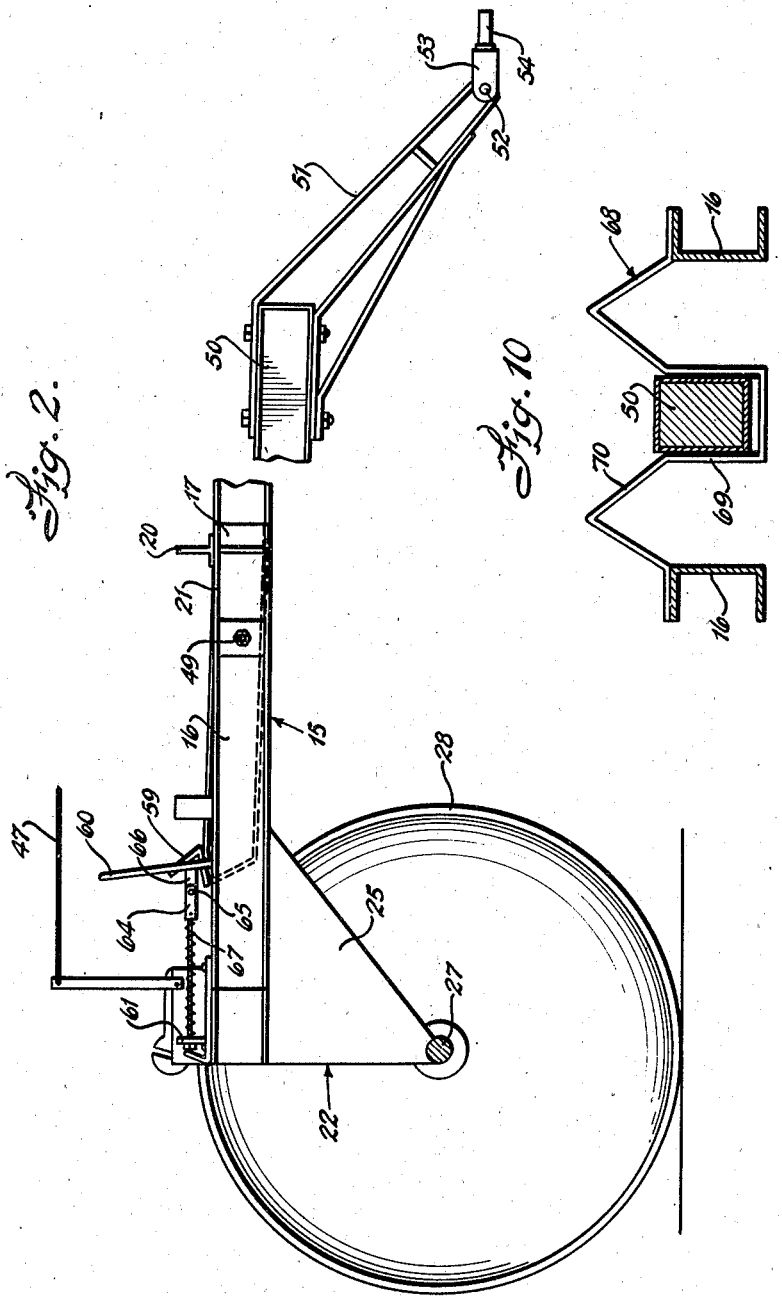

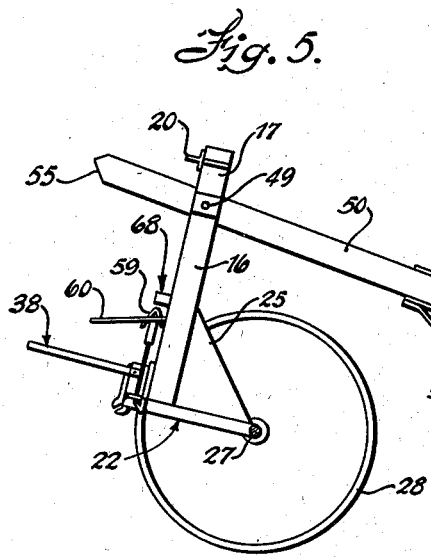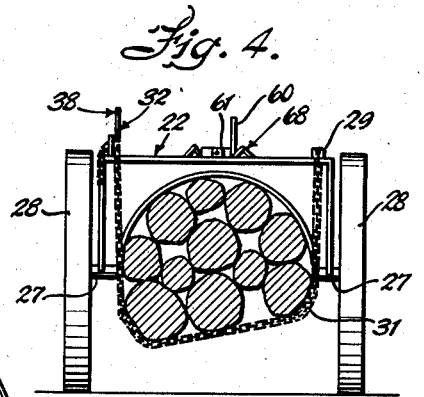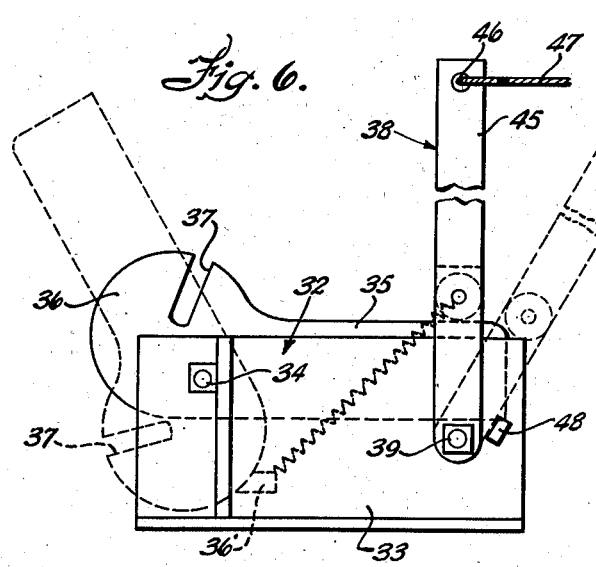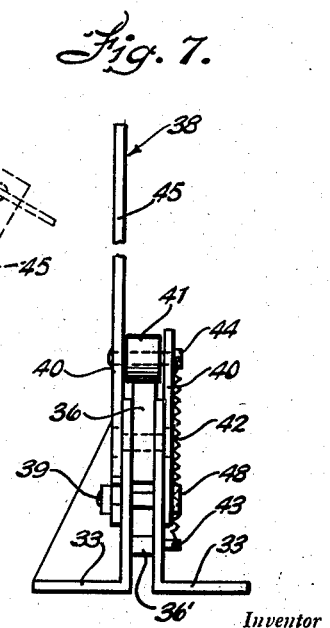

Patented June 22, 1948

2,443,972

UNITED STATES PATENT OFFICE 2,443,972

LOGGING CART

Charles E. Alexander, Raleigh, N. C.

Application November 12, 1946, Serial No. 709,263

1 Claim. (Cl. 214—65.3)

This invention relates to a logging cart and has for its primary object to assist in the transportation of a bundle of logs.

Another object is easily and quickly to load the cart and discharge the load therefrom.

A further object is to facilitate the connection and disconnection of a logging chain to the cart whereby the load may be readily discharged.

A further and more specific object of the invention is to strengthen the frame of the cart at all strategic points and to thereby improve the serviceability of the product.

The above and other objects may be attained by employing this invention which embodies among its features a pair of divergent side bars, spaced parallel extensions at the convergent ends of the side bars and inverted U-shaped axles secured to the divergent ends of the side bars, a bed plate extending from a plane adjacent the convergent ends of the side bars to a plane near the junction of the side bars and the axle, triangular shaped braces extending between the side bars and the legs of the axle, wheels on the axle, a draft tongue pivoted between the parallel extensions to swing about a horizontal axis, means releasably to latch the draft tongue against pivotal movement and means to attach the logging chain to the axle.

Other features include reinforcing gussets at the junctions of the side bars with their respective parallel extensions, and a stop adjacent the forward ends of the parallel extensions to limit the movement of the draft tongue above its pivot when the cart is in loading position.

In the drawings Figure 1 is a top plan view of a logging cart embodying the features of this invention, Figure 2 is a fragmentary side view thereof taken substantially along the line 2—2 of Figure 1, Figure 3 is a rear end view of the logging cart, Figure 4 is a view similar to Figure 3 showing a load of logs suspended in the cart, Figure 5 is a view similar to Figure 2 showing the cart in folded position ready to receive its load, Figure 6 is a side view of the releasable chain retainer, Figure 7 is an end view of Figure 6, Figure 8 is an enlarged fragmentary side view of a latch, Figure 9 is a sectional view of Figure 8, and Figure 10 is an enlarged sectional view taken substantially on the line 10—10 of Figure 1.

Referring to the drawings in detail my improved logging cart designated generally 15 comprises a pair of convergent side bars 16 preferably formed of channel irons with the flanges turned outwardly. The side bars 16 are formed with parallel forward extensions 17 adjacent their convergent ends and welded or otherwise secured to the bottom flanges of the side bars 16 is a bed plate 18 of generally triangular form. Suitable reinforced gussets 19 are welded or otherwise attached to the side bars 16 and extensions 17 adjacent their junctions as will be readily understood upon reference to Figure 1. Welded or otherwise attached to the parallel extensions 17 adjacent their forward ends is a reinforcing yoke 20 and welded to the extensions 17 adjacent the yoke 20 is a stop plate 21 the purpose of which will more fully hereinafter appear.

Welded or otherwise attached to the divergent ends of the side bars 16 is an axle designated generally 22. This axles comprises an arch strip 23 to the convex face of which is welded or otherwise secured a web 24. Welded to the side and top edges of the web 24 are plates 25 and 26. The plates 25 are of substantially triangular form and extend forwardly in convergent planes with upper edges welded to the bottom flanges of the convergent side bars 16. Suitable axle shafts 27 extend laterally from the lower most ends of the legs formed by the arch axle 22 and rotatably supported on said axle shaft 27 are wheels 28 of relatively large diameter.

Welded or otherwise attached to the top plate 26 of the axle 22 adjacent one end thereof is a crotched retainer 29 in the crotch 30 of which one end of a logging chain 31 (Figure 4) is received. A chain retainer designated generally 32 is attached to the axle 22 adjacent its opposite end, and this chain retainer comprises a pair of angle brackets 33 which are welded or otherwise attached to the plate 26 and to one of the side bars 16 as illustrated in Figure 1. These angle brackets are arranged in spaced parallel relation and pivotally supported at 34 adjacent their rear ends is a lever 35. Formed at the end of the lever 35 adjacent the pivot 34 and in eccentric relation thereto is an enlarged head 36 carrying a chain receiving notch 37 into which the opposite end of the logging chain 31 is adapted to be received. It is to be noted that the notch 37 is offset with relation to the pivot 34 so that the weight of a load of logs or the chain will tend to move the lever 35 into the dotted line position illustrated in Figure 6 to permit the chain to slip out of the notch 37 when it is desired to discharge the load. In order to maintain the lever 35 in load receiving position a retainer designated generally 38 is pivoted at 39 to the brackets 33, and this retainer comprises a pair of spaced parallel arms 40 between the upper ends of which is rotatably supported the roller 41 which when the retainer is in load retaining position engages the upper face of the lever 35 to hold it against pivotal movement above its pivot 34. A retractible coil spring 42 is anchored at one end to a stud 43 carried by one of the brackets 33 and at its opposite end to an extension 44 of the axle shaft of the roller 41. One of the bars 40 is extended as at 45 and is pierced adjacent its free end as at 46 for the reception of one end of a flexible cable 47 by means of which the retainer 38 may be swung about its pivot 39 to disengage the lever 35 as suggested by the dotted lines in Figure 6. A suitable stop 48 limits the movement of the retainer 38 under the influence of the flexible member 47. It will be understood of course that the opposite end of the flexible member is carried forwardly to a point within easy reach of the operator of the tractor to which the logging cart is attached.

Mounted to swing above a horizontal axis at pivot point 49 between the parallel extensions 17 is a draft tongue 50 carrying at its forward end a downwardly and forwardly extending angle bracket 51 to the extreme forward end of which is pivoted as at 52 a U-shaped yoke 53 in which is swivelly mounted an eye 54 which serves as a coupling unit for the traction vehicle. It will thus be seen that irrespective of the tilting of the traction vehicle, no tilting action will be transmitted to the tongue 50 because of the universal movement of the eye 54. The ends of the tongue 50 opposite that carrying the bracket 51 is bevelled as at 55 for engagement with a latch unit to be more fully hereinafter described.

The latch unit above referred to comprises an inverted U-shaped yoke 56 which is pivotally supported at 57 in brackets 58 which are attached to the bed plate 18 in any suitable manner. The legs of the yoke 56 extend downwardly as illustrated in Figures 8 and 9 and welded or otherwise secured to the bight portion of the yoke 56 is a latch head 59 which as illustrated in Figure 2 is adapted to engage the upper side of the tongue 50 adajacent the end carrying the latch face 55. A hand lever 60 is welded or otherwise attached to the yoke 56 in order that it may be swung about its pivots 57 to release the tongue 50 and permit the cart to "jack-knife" as illustrated in Figure 5. In order to hold the latch member 59 into contact with the tongue 50 I weld or otherwise attach to the cross member 26 an upwardly extending ear 61 which is formed with an opening 62 for the reception of a plunger rod 63. This plunger rod is movable through the opening along an axis lying parallel with the longitudinal axis of the tongue 50. Carried at the forward end of the rod 63 is a yoke 64 to the forward end of which is pivotally connected at 65 a link 66 which extends forwardly and is rigidly fixed to the latch member 59 as will be readily understood upon reference to Figure 8. Surrounding the rod 63 between the bracket 61 and the yoke 64 is a compression coil spring 67 which yieldingly holds the entire latching mechanism in advance tongue engaging position as will be readily understood upon reference to Figure 8.

In order to assure proper alignment of the tongue when the latter is in latched position, I provide a keeper designated generally 68 which comprises a strip of metal bent to form a U-shaped retaining yoke 69 and upwardly divergent guide bars 70 so that as the tongue moves into position to be latched, it will be positively directed into proper position.

In use it will be understood that the cart is backed into position over one end of a bundle of logs to be moved and one end of the chain 31 is seated in the crotch of the chain retainer 39. The opposite end of the chain 31 is then passed beneath the group of logs to be moved and with the cart in jack-knife position as illustrated in Figure 5 the opposite end of the chain is entered into the notch 37 of the retainer 32. Upon exerting pull on the eye 54 it will be obvious that the pivot point 49 will swing about the axes of the wheels 28 to cause the tongue to enter between the guide 70 into the yoke 69, forcing the latch plate 59 backward against the pressure of the spring 67 until the upper edge of the tongue passes the latch at which time the latch 59 will lock the tongue in substantial alignment with longitudinal axis of the cart body. The logs may then be transported to their destination whereupon the operator of the traction vehicle exerts pull on the flexible member 47, thus causing the retainer 38 to swing about its pivot 39 and the lever 35, permitting the latter to fly upwardly under the weight of the logs on the chain until the chain releases. Engaging the stop 36', the head 36 and the lever 35 will cause the lever to rebound and return to its original position so that upon releasing pull on the flexible member 47 the lever 35 may again be locked in position to receive the logging chain ready for the next load.

When it is again desired to load the cart the process is repeated and the tongue 50 is again released by exerting pull on the lever 60 to move the latch 59 against the spring 57 and permit the cart to jack-knife as illustrated in Figure 5. The loading may then again take place and the same cycle of operations repeated.

While in the foregoing there has been shown and described the preferred embodiment of this invention it is to be understood that minor changes in the details of construction, combination and arrangement of parts may be resorted to without departing from the spirit and scope of the invention as claimed.

What is claimed is:

A logging cart comprising an arched axle, wheels on opposite ends of the axle, a side bar fixed adjacent each end of the axle, said side bars converging as they recede from the axle and terminating in spaced parallel extensions which lie perpendicular to the axle, a draft tongue pivotally supported between the extensions to swing about an axis which lies parallel to the axle, a U-shaped keeper extending transversely between the side bars intermediate the parallel extensions thereof and the axle, upwardly extending divergent guides on the keeper for guiding the draft tongue into the keeper as it swings about the pivotal support thereof, and a latch mounted on the axle to hold the draft tongue in the keeper.

CHARLES E. ALEXANDER.

REFERENCES CITED

The following references are of record in the file of this patent:

UNITED STATES PATENTS

| Number | Name | Date |
| --- | --- | --- |
| 2,301,994 | Atkinson | Nov. 17, 1942 |
| 2,317,784 | Lewis | Apr. 27, 1943 |
| 2,361,181 | Dowd | Oct. 24, 1944 |
| 2,376,953 | Allen | May 29, 1945 |
| 2,377,201 | Baird | May 29, 1945 |